July 17, 1923.
D. L. STULL
1,461,836
CONE BAKING MACHINE
Filed July 7, 1919
4 Sheets-Sheet 2
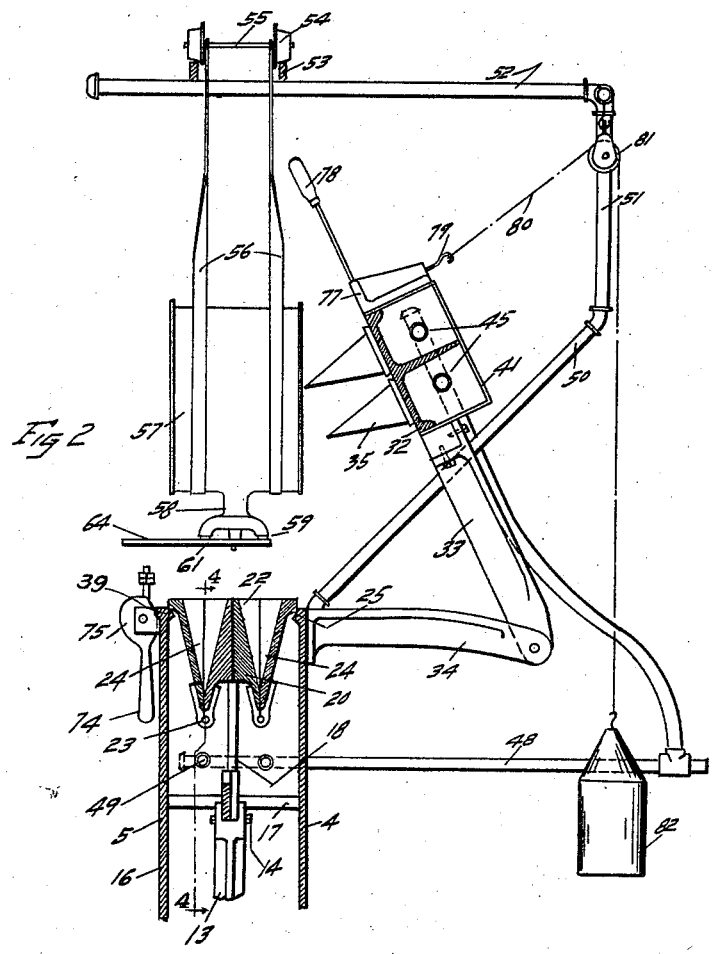
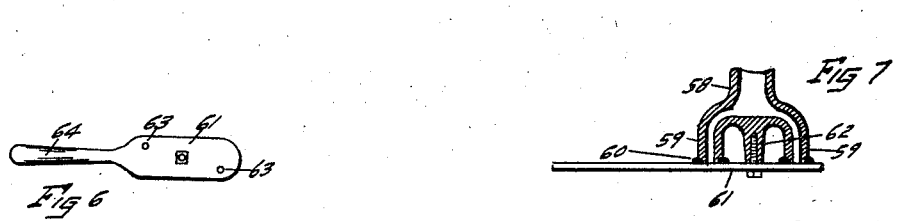
Witness
C. VAN DEN BERG.
Inventor
D. L. STULL
By
Attorney July 17, 1923.
D. L. STULL
1,461,836
CONE BAKING MACHINE
Filed July 7, 1919
4 Sheets-Sheet 3
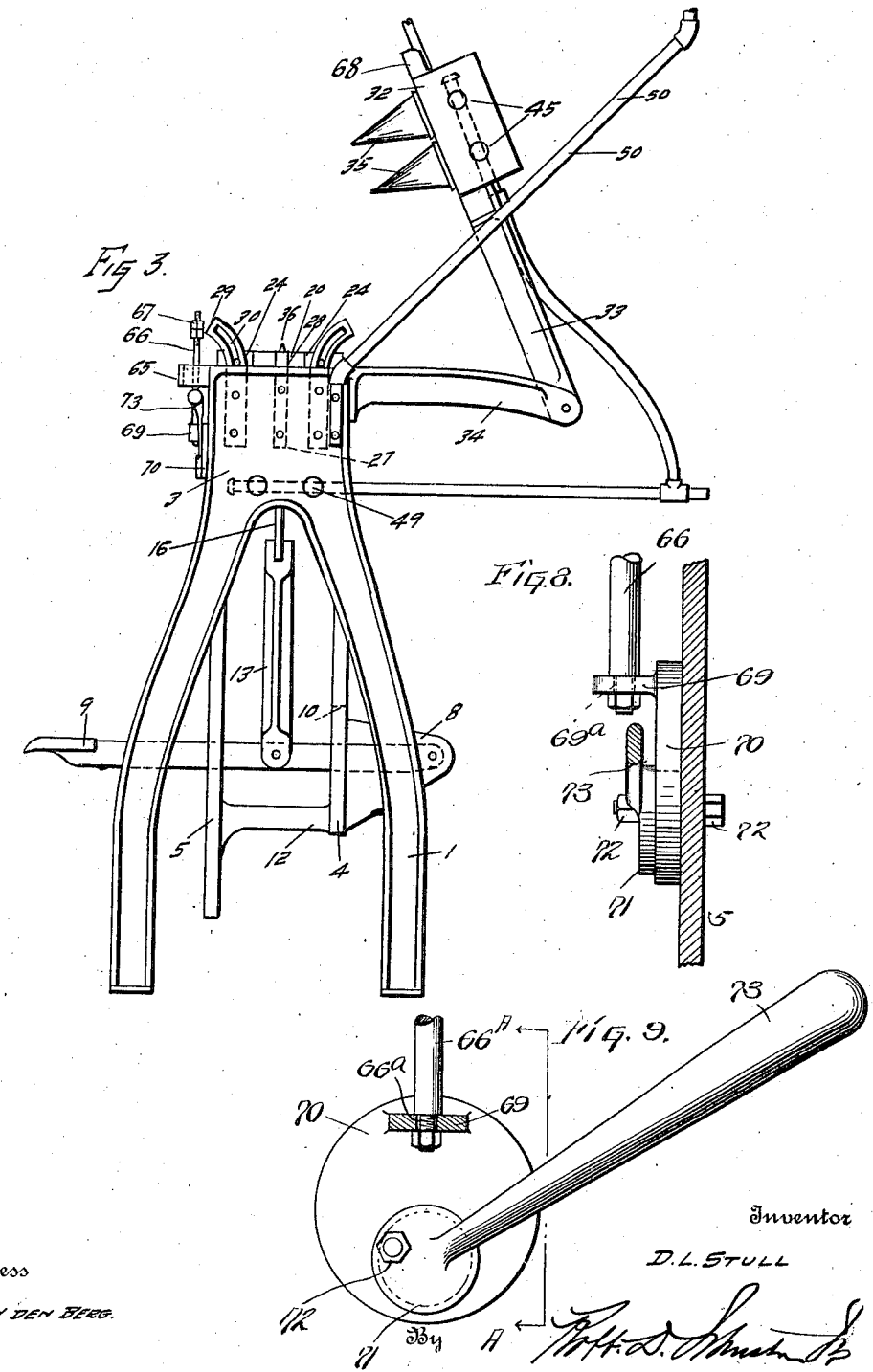

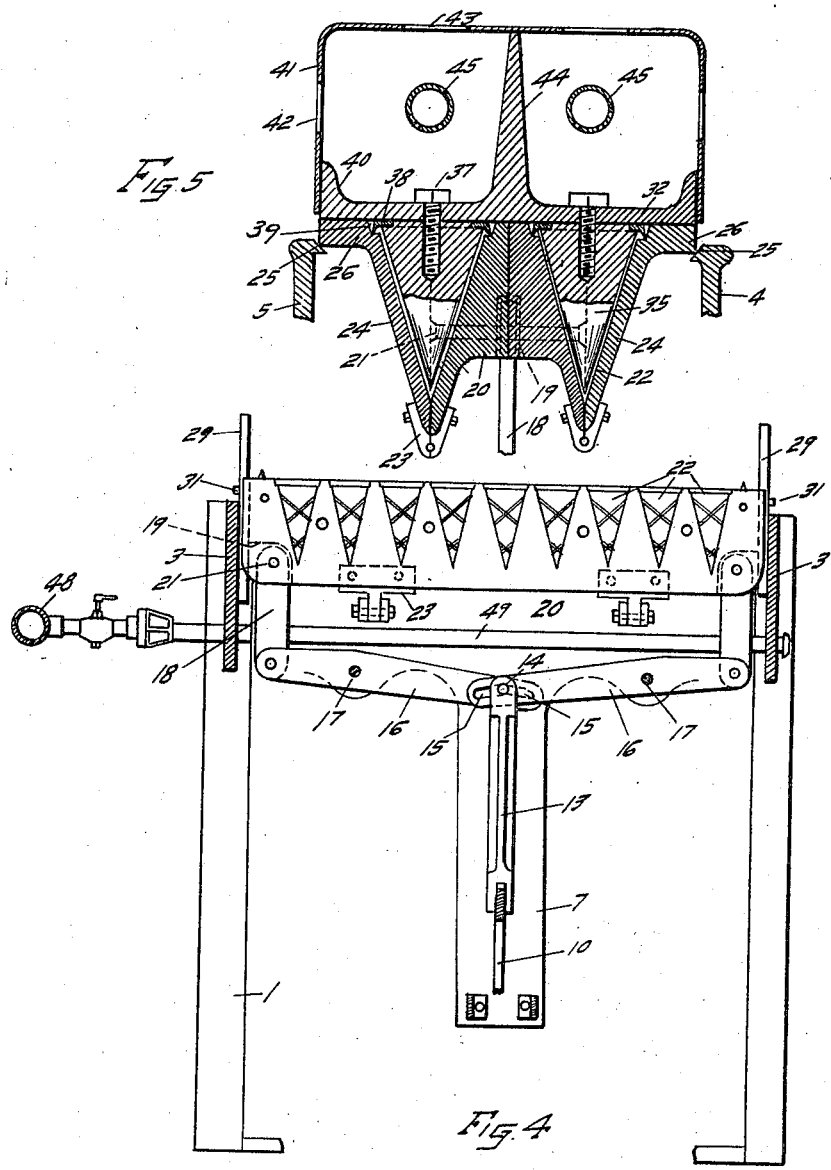

Patented July 17, 1923.

1,461,836

UNITED STATES PATENT OFFICE.

DAVID L. STULL, OF BIRMINGHAM, ALABAMA.

CONE-BAKING MACHINE.

Application filed July 7, 1919. Serial No. 309,183.

*To all whom it may concern:*

Be it known that I, DAVID L. STULL, a citizen of the United States of America, residing at Birmingham, in the county of Jefferson and State of Alabama, have invented certain new and useful Improvements in Cone-Baking Machines, of which the following is a specification.

My invention relates to an apparatus for the manufacture of ice-cream cones and like baked pastries, and is more particularly adapted for hand operation.

My invention is more particularly adapted for the production of cake cones or like baked pastries in which the amount of sugar is sufficient to cause the baked product to stick in the molds and therefore makes necessary the use of a sectional, separable mold to make easy and practical the removal of the baked product.

One object of my invention is to simplify and perfect the mechanism for quickly separating and positively reassembling the sections of the mold and for accomplishing this operation preferably by a foot pedal so as to leave the hands of the operator free.

A further object of my invention is to simplify and perfect the mechanism for the distribution of batter.

A further object of my invention is to improve the arrangement for heating the molds both above and below to produce a uniform cooking of the product.

My invention further comprises the novel details of construction and arrangements of parts, which in their preferred embodiment only are illustrated in the accompanying drawings, in which:—

Fig. 2 is a vertical sectional view of Fig. 1.

Fig. 3 is a side elevation of Fig. 1.

Fig. 4 is a longitudinal vertical section taken on the line 4—4 of Fig. 2.

Fig. 5 is an enlarged cross sectional view taken on the line 5—5 of Fig. 4.

Fig. 6 is a plan view of the rotating batter valve.

Fig. 7 is a view in side elevation of the valve with the feed nozzles shown in vertical section.

Fig. 8 is an enlarged side view of the eccentric mounting for the clamp members, the view being taken on the section line A—A of Fig. 9.

Fig. 9 is a front elevation of Fig. 8 with the clamp bolt lug shown in cross section.

Similar reference numerals refer to similar parts throughout the drawings.

Figure 1:
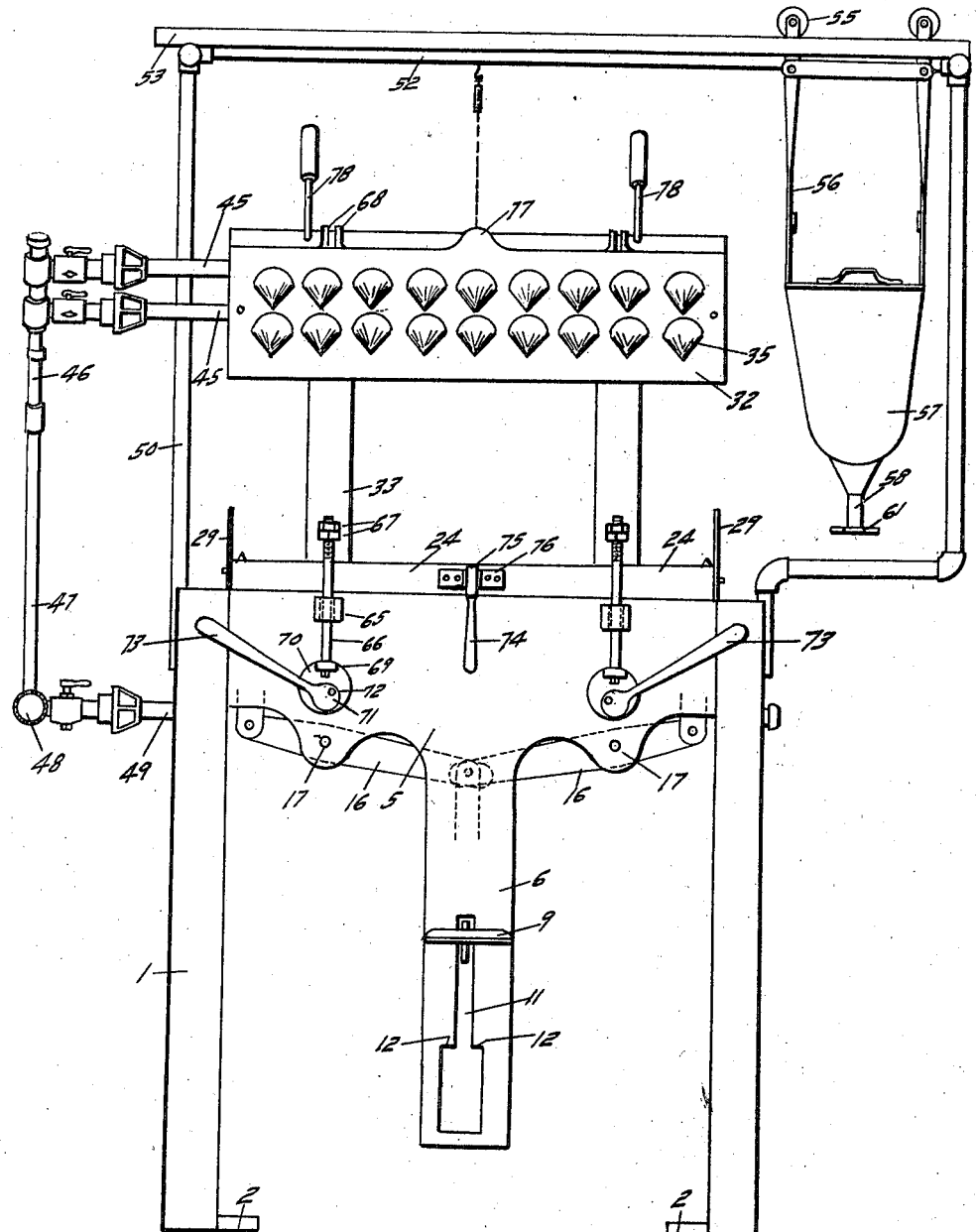
Fig. 1 is a front elevation of a cone baking machine with the movable core carrier in raised position.

I have shown my invention embodied in a rectangular frame having legs 1 which are provided with angles 2 for attachment to the floor. The frame comprises vertical end walls 3 connected to a back wall 4 and a front wall 5. Both the front and back walls are provided with downwardly extending central members 6 and 7, respectively, the member 7 having attached at its base a bearing bracket 8 in the outer end of which a pedal lever 9 is pivoted and adapted to project forwardly through slots 10 and 11 in the extension members 6 and 7, respectively, this latter slot being enlarged at its base so as to provide an offset stop shoulder 12 which will engage and hold the treadle in lowered position. A link 13 is pivotally connected to the treadle at its lower end and at its upper end is bifurcated and provided with a pin 14 which works in the curved elongated slots 15 at the inner ends of the rocking levers 16, which levers are fulcrumed on pins 17 seated in front and rear walls of the frame and extending crosswise thereof. At their free outer ends these rocking levers are pivotally connected to vertical arms 18 which enter slots 19 at each end of the center member 20 of the mold and are pivotally connected thereto by pins 21, the slots being of such size and shape as to permit the arms to swing freely as they are moved by levers 16 to raise and lower the female mold. As illustrated, this mold comprises the central member 20 which preferably is cast in longitudinal sections which are riveted together. This member extends from side to side of the machine and in its vertical side faces is provided with half mold cavities for the molds 22. In the machine illustrated the central member is provided on each side with nine of these half molds, but of course this number may be varied, and along its bottom edges is provided with hinges 23 which connect thereto on each side a side member 24 having formed in its inner face adjacent to the member 20 nine complementary half molds to complete the molds 22. The central member 20 is trapezoidal in cross section with a recess along its base to lighten it.

Along the upper inner edges of the front and rear walls 4 and 5 of the frame I provide taper seats 25 which when taken together act as a wedge and are adapted to be engaged by out-turned flanges 26 of the side mold members 24 and these wedges are so set that they will act as the mold members drop to their lowered position to wedge the members 24 tightly against the central member 20 so as to perfectly close the joint in the molds 22. The frame at each end is provided with a vertical guide 27 which works in a vertical slot 28 in the end of the central member 20 and each end wall 3 is also provided with a pair of upwardly and outwardly curving guide plates 29 having arcuate slots 30 therein which receive pins 31 on the ends of the side members 24 and thus serve to swing these members outwardly away from the central member 20 as the molds are lifted by the depression of the pedal. In this manner the molds 22 open up for the easy delivery of the baked product.

The upper male mold element comprises a top baking iron or carrier 32 provided with rearwardly extending arms 33 which are pivoted at their outer ends to elongated supporting arms 34 attached to the rear wall 4 of the frame and made long enough to permit the cores 35 on the carrier to enter centrally into the molds 22 as the carrier 32 is moved to closed position. The arms are also long enough to permit the carrier in its raised position to swing from position overhanging the frame so that it can be cleaned without dropping particles into the molds 22 or into the baked cones. The carrier 32 is provided with suitable holes to receive dowel pins 36 on the central mold member 20 which center the cores 35 accurately in the molds 22. The cores are attached to the carrier 32 by screws 37 (see Fig. 5), and are provided in their upper peripheral edges with a recess to receive a detachable annular outwardly inclined trimming knife 38 which is held in place between the core and carrier and has its edge disposed to engage the marginal edge of a seat 39 surrounding the top of its respective mold 22. The carrier 32 is flat on its under side and on its upper side is provided with upturned marginal flanges 40 to which is attached a sheet metal hood 41 provided with lateral air inlet ports 42 and top air inlet ports 43. The hood at its center is supported by a longitudinal web 44 integral with the carrier 32 and extending from end to end thereof so as to form with the hood two burner chambers in each of which I mount a longitudinal gas burner pipe 45 having suitable air and gas valves and connected to a gas supply pipe 46 having a flexible section 47 which is connected to the main gas supply pipe 48 from which lead burners 49 that pass through the adjacent end wall 3 of the frame and underlie the joints between the sections of molds 22, as seen in Fig. 2.

The overhead frame is attached to the rear wall 4 and comprises rearwardly and upwardly sloping pipe members 50 having vertical extensions 51 connected overhead to a horizontal rectangular pipe frame 52 which extends forwardly so as to overhang the machine and is adapted to support the tracks 53 which extend lengthwise of and centrally above the machine and receive the bevelled wheels 54 of the carriage 55 which, by means of the downwardly hanging straps 56, supports a batter tank 57. This batter tank is provided at its bottom with a batter discharge pipe 58, see Fig. 7, which delivers the batter to the nozzles 59 which have a small batter discharge passage therethrough. The batter nozzles are surrounded at their bottom ends with rubber packing rings or washers 60 which bear upon a flat batter valve 61 pivotally mounted by means of a screw pin on a web 62 on the pipe 58 midway between the nozzles. The batter valve has batter ports 63 disposed in position to be moved by a handle 64 into register with the nozzles 59. The nozzles are disposed so as to travel with the carriage along over each row of molds 22.

The front wall 5 of the machine is provided with bosses or lugs 65 having vertical slots therethrough elongated transversely of the machine and adapted for the passage of latch bolts 66 which have nuts 67 screwed on their upper ends so as to serve as catches. The carrier 32, in alignment with each lug 65, is provided with a pair of spaced keeper lugs 68 between which the adjacent latch bolt 66 is adapted to be received when the mold is closed and which is adapted to be engaged above by the latch nuts 67. Each latch bolt 66 is operated by a suitable clamp mechanism to press the mold elements together as shown, each bolt at its lower end is connected to and movable with a lug 69 on an eccentric strap or plate 70 which surrounds and is mounted upon an eccentric 71 fulcrumed to the machine frame by means of a pin 72 and provided with an operating handle 73. The eccentric 71 has its outer portion enlarged to overhang the strap or plate 70 and it thus serves to hold the plate in operating position on the frame. The opening in each lug 69 for the latch bolt is of such character as to permit the bolt to have the necessary angular play towards and from the machine to permit it to be disengaged by hand from the lugs 68 or to be swung inwardly to engage said lugs. This loose mounting may be accomplished by an enlarged bolt hole 69ª provided in the lug 69 for the reduced threaded shank 66ª of the bolt. The shoulder left on the bolt by this reduced shank serves to support the bolt on the lug 69. The handles are disposed in opposite directions at each side of the machine. When the latches are in operative position by depressing the handles 73 a very great leverage is brought to bear through the eccentrics and eccentric straps to pull the bolts downwardly and with great power clamp together the mold elements in their assembled position.

To facilitate the opening of the molds after the cooking operation, I provide a lever 74 having an eccentric head 75 pivotally mounted in bearings 76 on the outer mold member 24, the eccentric being so designed that as the lever is drawn upwardly the eccentric will engage a lug 77 on the carrier 32 for the cores and prize the latter upwardly to loosen it so that as soon as the latches are released it is free to be lifted by means of the handles 78. The operator may be relieved of this duty of raising and holding the carrier 32 in its open position by the provision of counterweight mechanism comprising a screw hook 79 on the carrier to which I connect a chain or cord 80 which passes over a pulley 81 suspended from the rear cross member of the overhead frame 52 and has suspended at its free end a counterweight 82.

In operation, assuming the parts in the position shown in Figs. 1 and 2, in which the pedal is raised to close molds 22, the operator then shifts the batter tank above the molds and moves it lengthwise above them setting the valve 61 to discharge the batter at the desired rate. After depositing the batter, the handles 78 are grasped and the top carrier 32 drawn downwardly until its keeper lugs 68 engage under the catch nuts 67 of the latches and the cores assume position in the molds. The operator then depresses the levers 73, causing the latch bolts 66 to clamp the carrier with great power against the molds and to hold the parts in this position during the cooking operation, the molds being heated above and below by the burners to uniformly cook the product. As soon as this has occurred the levers 73 are raised, the latches released, and the opening eccentric lever 74 is lifted to prize the carrier 32 loose, after which the counterweight will raise it to the position shown in Fig. 2. The trimming knives will be found to have trimmed the cones from the batter which is baked against the carrier or top baking iron 32 and to have keyed this baked batter to the carrier. The operator then depresses the pedal, catching it under a shoulder 9 thereby lifting and opening out the molds 22 so that the cones can be lifted out. After this a knife is passed lengthwise between the rows of cores 35, to cut and part the baked batter keyed on the carrier 32 and cause it to drop away. It is to be noted that in doing this none of this baked product will be caused to fall into the molds or into cooked cones but will fall clear of the machine and to the rear thereof, due to the rearward overhang of the carrier, when in open position.

This invention is not intended to be restricted in scope to the specific embodiments shown, but contemplates such modifications as come within the spirit and scope of the claims.

Having thus described my invention, what I claim as new and desire to secure by Letters Patent, is:—

1. In a baking machine for cores and the like, a frame, a mold comprising a series of mold cavities and divided into sections lengthwise of said series, means to raise and lower said mold, cores for the mold cavities, end guides on the frame and coacting elements on the mold sections disposed and adapted to separate and close the mold sections as they are raised and lowered, and a taper face extending along the frame on each side of the mold and adapted to be engaged by the side mold sections as they are lowered to co-operate with the end guides in forcing said sections to closed position.

2. In a baking machine for cones and the like, a frame, a sectional elongated mold element containing a plurality of molds, pedal mechanism to raise and lower said mold sections, a core carrier, end guides to separate the mold sections as they are raised, wedge means effective throughout the length of the mold element to press the mold sections together as they are forced downwardly by said pedal mechanism to lowered position, and a catch to hold the pedal mechanism in its lowered position.

3. In a cone baking machine, a mold and core, a movable carrier for the core, screw means to clamp the core to its carrier, and an annular flanged knife having its flange interposed between the core and carrier and detachably held in place.

4. In a cone baking machine, molds and cores therefor, a movable carrier for the cores, and an outwardly flaring annular trimming knife adapted to key the baked batter above the cores to the carrier.

5. In a cone baking machine, a mold and core, a movable carrier for the core, and an outwardly flaring annular trimming knife projecting from the base of the core and adapted to key the batter above the core to the carrier.

6. In a cone baking machine, a frame carrying female cone molds, a movable carrier, cores carried thereby, and annular trimming knife edges for the cores adapted to key the batter webs between cones to the movable carrier.

7. In a cone baking machine, a frame carrying female cone molds, a movable carrier, cores carried thereby, and rigidly mounted trimming knife edges for the cores adapted to key the batter webs between cones to the movable carrier, said carrier being movable from a position overhanging the female molds, as and for the purposes described.

8. In a cone baking machine, a frame carrying female cone molds, a movable carrier, cores carried thereby, said carrier and its cores being movable from position overhanging said frame, and rigidly outwardly flaring trimming knives for the cones which are shaped to key the batter webs between cones to the carrier.

9. In a cone baking machine, a frame, molds therein, a top baking iron, cores depending from said iron, trimming knives surrounding the bases of said cores and outwardly flared to form batter keys, hinge arms on which said top iron is adapted to be swung upwardly and outwardly until it no longer overhangs the frame or molds, and a counterweight tending to hold said top iron in said latter position.

10. In a cone baking machine adapted for hand operation, a frame, relatively movable male and female mold elements thereon, swinging catches to hold the elements in assembled position, and reversely movable power multiplying levers to move the catches vertically and clamp the mold elements.

11. In a cone baking machine adapted for hand operation, a frame, female cone molds mounted thereon, a movable carrier having cores, catches on the frame adapted to engage the said carrier as the mold elements are closed together, eccentric straps to which said catches are connected, and hand levers having eccentrics adapted to move said straps and tighten the catches to clamp the carrier to the frame.

12. In a cone baking machine adapted for hand operation, a frame, female cone molds mounted thereon, a movable carrier having cores, catches on the frame adapted to be moved into engagement with the said carrier as the molds are closed and comprising outwardly swinging bolts connected to eccentric straps at their bases, keepers on the carrier with which said bolts are adapted to interlock, and lever operated eccentrics mounted to rotate on the frame and adapted each to co-act with an eccentric strap to shift the bolts bodily, as and for the purposes described.

13. In a cone baking machine, a frame, a sectional baking iron parted longitudinally and having formed between its center element and its side elements a plurality of cone molds, a vertical guide in the frame for the center element, upwardly and outwardly curving guides projecting above the frame at each end and having outwardly curving guides for said side elements, lever mechanism to reciprocate the mold elements vertically, wedge means effective for the length of said side elements to press them against the center element when lowered, co-acting mold cores, and means to heat the molds.

In testimony whereof I affix my signature.

DAVID L. STULL.

Witness:
NOMIE WELSH.